United States Patent [19]

Gasparaitis et al.

[11] Patent Number: 4,725,395
[45] Date of Patent: Feb. 16, 1988

[54] ANTENNA AND METHOD OF MANUFACTURING AN ANTENNA

[75] Inventors: Bernard V. Gasparaitis, Tamarac; Thomas W. Long, Coral Springs; Kazimierz Siwiak, Sunrise, all of Fla.

[73] Assignee: Motorola, Inc., Schaumburg, Ill.

[21] Appl. No.: 689,117

[22] Filed: Jan. 7, 1985

[51] Int. Cl.⁴ .................. B29C 45/14; B29C 45/16; H01Q 1/40

[52] U.S. Cl. .................. 264/250; 264/272.15; 264/272.19; 264/262; 29/601; 29/856; 343/873; 343/895

[58] Field of Search ............... 343/895, 715, 872, 873, 343/749; 264/272.19, 275, 272.11, 272.12, 272.14, 272.15, 274, 250, 272.16, 262; 336/205, 192; 29/600, 601, 602 R, 856

[56] References Cited

U.S. PATENT DOCUMENTS

| | | | |
|---|---|---|---|
| 3,368,175 | 2/1968 | Giegerich et al. | 336/96 |
| 3,590,329 | 6/1971 | Krepps | 264/272.19 |
| 3,605,046 | 9/1971 | Miller | 333/95 |
| 3,737,910 | 6/1973 | Francis et al. | 343/895 |
| 3,774,221 | 11/1973 | Francis | 343/749 |
| 3,781,899 | 12/1973 | Lockwood | 343/895 |
| 3,828,353 | 8/1974 | Majkrzak et al. | 343/873 |
| 4,083,902 | 4/1978 | Clyde | 264/261 |
| 4,086,596 | 4/1978 | Gauss et al. | 343/749 |
| 4,193,185 | 3/1980 | Liautaud | 264/272.19 |
| 4,205,319 | 5/1980 | Gasparaitis et al. | 343/792 |
| 4,255,735 | 3/1981 | Liautaud | 343/715 |
| 4,375,642 | 3/1983 | Dorrie et al. | 343/895 |
| 4,435,713 | 3/1984 | Gasparaitis et al. | 343/702 |
| 4,435,716 | 3/1984 | Zandbergen | 343/895 |

*Primary Examiner*—William L. Sikes
*Assistant Examiner*—Michael C. Wimer
*Attorney, Agent, or Firm*—Daniel K. Nichols; Joseph T. Downey; Anthony J. Sarli

[57] ABSTRACT

This antenna includes a helically formed wire coil having a lower end that is positioned in a connector a solid dielectric material is injection molded into the coil and connector to precisely maintain the coil dimensions and support the coil. An outer cover is injection molded over the coil and dielectric material.

3 Claims, 5 Drawing Figures

ANTENNA AND METHOD OF MANUFACTURING AN ANTENNA

BACKGROUND OF THE INVENTION

This invention relates to antennas in general and particularly to a helical antenna for use with a portable radio device. The use of helical antennas is well known in devices operating in the VHF and lower portion of the UHF range. Such antennas are physically shorter than both conventional quarter wave whip type antennas and dipole antennas.

Conventionally, helical antennas, for the aforementioned frequency ranges, are constructed by winding a helical coil, attaching the coil to the antenna connector, encasing the coil in a plastic sleeve, trimming the coil to desired resonance and placing a cap over the upper trimmed end of the antenna. Such antennas must be trimmed for frequency resonance after construction, due to the fact that various parameters such as the pitch of the helix can be changed during construction. It is, therefore, not possible to precut the antenna to the desired resonant frequency utilizing normal construction techniques.

A further problem exists in attempting to utilize such antennas at higher UHF frequencies such as in the 800 and 900 megahertz ranges. At such frequencies, the antennas become extremely sensitive to slight variations in the dimensions of the antenna. Such deformations can occur from flexing or impact to the antenna and can result in permanent deformation thereby placing the resonance of the antenna out of the desired range.

SUMMARY OF THE INVENTION

This helical antenna can be accurately manufactured and maintain its dimensions for maintaining the desired electrical resonance through the manufacturing process and in normal use of the antenna.

The antenna includes a substantially helical electrically conductive coil, having upper and lower ends. A substantially rigid, solid dielectrical material is included within the helical coil for maintaining dimensions of the helical coil and individual helices.

In one aspect of the invention, the dielectric material is injection molded. In another aspect of the invention, the dielectric material is located within the the mounting means for maintaining position of the lower end and supporting the helical coil.

In still another aspect of the invention, a resiliant electrical contact engages the lower end within the housing to provide the electrical connection to the helical coil. An outer covering is provided about the helical coil and dielectric material.

In still another aspect of the invention, the dielectric material provides an outer surface with spaced indentions and the outer covering is received in the indentions of the dielectric material.

A method of manufacturing the antenna comprises the steps of forming a wire into a predetermined shape, positioning the formed wire within a mold, injecting a dielectric material into the mold to fill the interior of the formed wire, and covering the formed wire with an outer covering.

In one aspect of the invention, prior to injection of the dielectric material into the mold, a connector is positioned on the lower end of the helical wire and the dielectrical material seals the area between said wire and the connector. In still another aspect of the invention, the formed wire is anchored within the mold for precisely maintaining the dimensions of the wire and the pitch of the helix during molding operations. In still another aspect of the invention, after injecting the dielectric material, the formed wire is placed in a second mold and the outer covering is injection-molded.

DESCRIPTIONS OF THE DRAWINGS

DESCRIPTION OF THE PREFERRED EMBODIMENT

Figure 1:
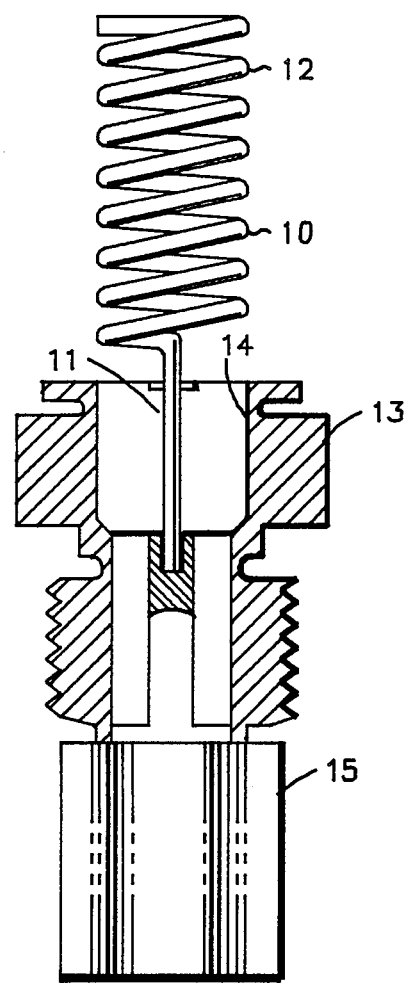
FIG. 1 is an elevational view partially in a cross section showing the formed helical wire inserted into a connector.

Referring now by characters of reference to the drawings and first to FIG. 1, it will be understood that the antenna includes a helical wound electrically conductive wire coil 10 having a lower end 11 and an upper end 12.

A threaded retainer 13 constituting mounting means, includes a longitudinal passage 14 which receives the coil lower end 11 and a tool plug 15. The tool plug 15 receives and precisely positions the lower end 11 within the retainer 13 during antenna manufacturing operations.

Figure 2:
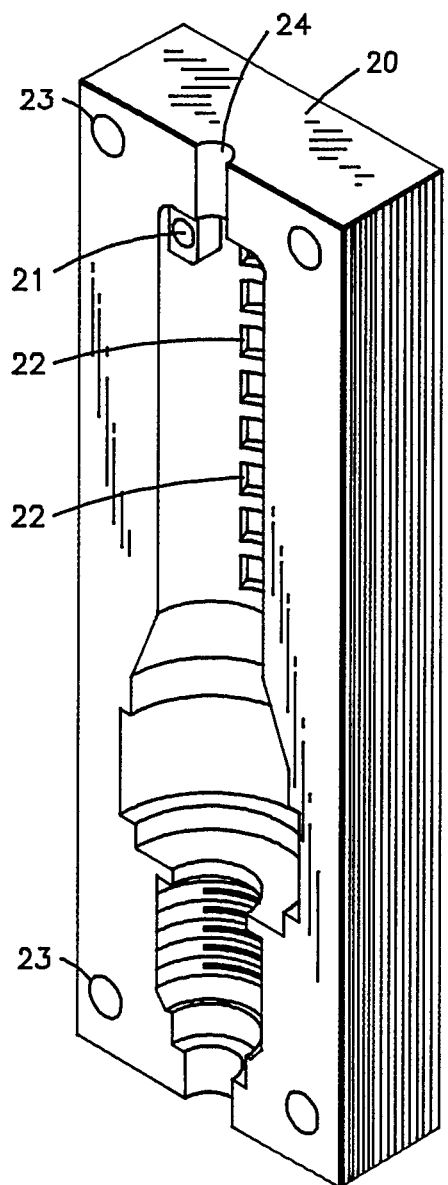
FIG. 2 is a plan view of a dielectric mold portion.

A dielectric mold half 20 is shown in FIG. 2. The mold half 20 is tooled to receive the helical coil 10, retainer 13 and tool plug 15. The mold half 20 includes an aperture 21 designed to receive the upper end 12 of the helical coil 10 for locking it firmly in position during molding operation. A plurality of spaced positioning members 22 are located within the mold half 20. Individual turns of the helical coil 10 are received between adjacent members 22 to precisely maintain coil dimensions during molding operations. It will be appreciated that a complementary mold half (not shown) is utilized in conjunction with mold half 20. The complementary mold half includes positioning members 22 but is provided without an aperature 21. Alignment holes 23 are provided for alignment and attachment of the mold halves, as by bolting. An opening 24 is provided in mold halves 24 for injection of the desired dielectric material, which in the preferred embodiment is polypropylene G 60/30.

Figure 3:
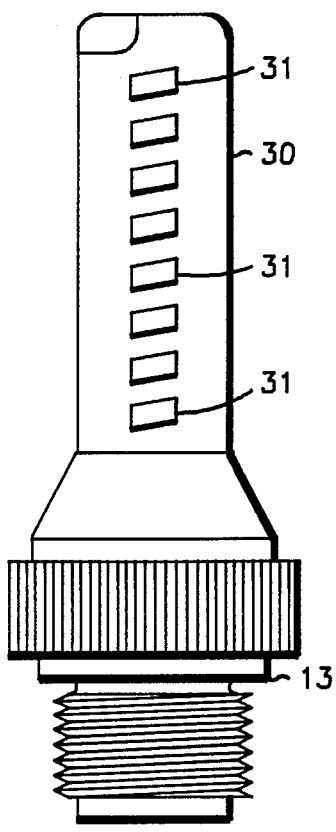
FIG. 3 is an elevational view of the antenna after the molding of the dielectric material.

FIG. 3 discloses the antenna after the first molding operation. The molded dielectric material 30 includes, on opposed sides, spaced indentions 31 which are formed by and which correspond to the shape of the positioning members 22.

Figure 4:
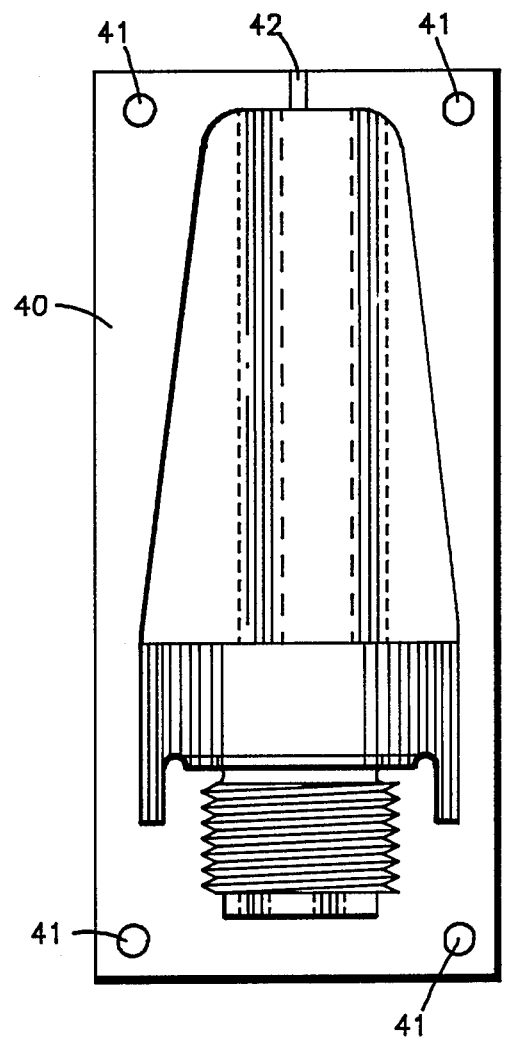
FIG. 4 is a plan view of a cover mold portion.

A second, outer cover, mold half 40 is shown in the FIG. 4. The mold half 40 is tooled to receive the antenna and define the desired outer shape of the antenna. A complementary outer cover mold half (not shown) is provided and the outer cover mold halves are aligned as by bolting through holes 41. The outer covering of a material is injection molded through opening 42. In the preferred embodiment the outer covering is of polyurethane material having a durometer of 90, plus or minus 5.

Figure 5:
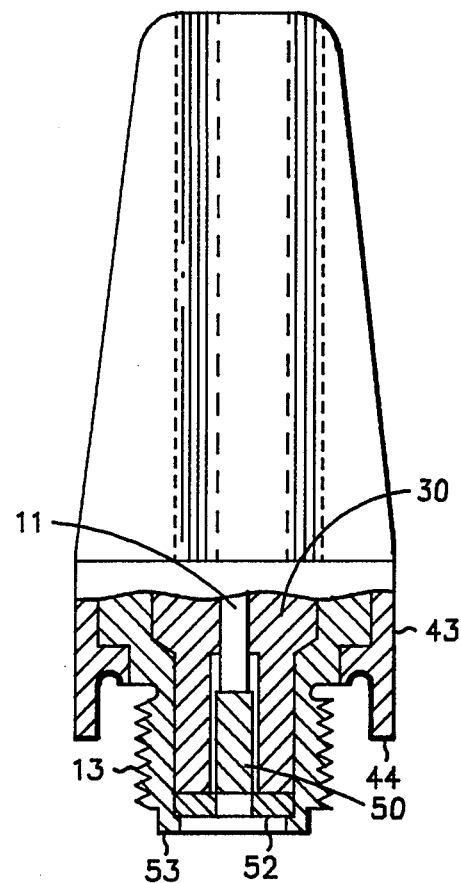
FIG. 5 is an elevational view, partially in cross-section, of the antenna.

Referring now to FIG. 5, the finished antenna is shown. The outer cover 43 provides a protective covering for the coil 10 and dielectric material 30. The cover 43 extends over the upper part of the retainer 13 and includes a downwardly depending lower skirt 44 which can provide a seal when the retainer is threadedly connected to a radio (not shown).

It will be understood, that after molding the dielectric material 30, the tool plug 15 is removed from the retainer 13. A resilient conductive contact 50 is positioned within the retainer 13 to electrically engage the coil lower end 11. The dielectric material 30 within the retainer 13 insulates the contact 50 from the retainer. An insulating end washer 52 is positioned to retain the contact 50 within the retainer 13, with the lower edge 53 of the retainer 13 being rolled to retain the washer 52. Electrical connection to the antenna is made through the center of the insulating end washer 52 to the contact 50.

It will be appreciated that the disclosed antenna construction can be utilized with other antenna connectors, as for example, a SMA type is closest to this physical size type connector, as required for mating with any particular radio.

We claim:

1. A method of manufacturing an antenna comprising the steps of:
   positioning and anchoring a helically shaped wire within a mold,
   positioning a retainer about an end of said helically shaped wire within said mold,
   injecting a dielectric material into the mold to fill the interior of the helically shaped wire and an area within said retainer about said wire end for maintaining the position of the end and supporting the helically shaped wire,
   then placing the helically shaped wire in a second mold,
   injection molding an outer covering over the helically shaped wire and a portion of said retainer, and
   positioning a resilient conductive contact within the retainer in electrical engagement with said end of the helically shaped wire.

2. A method of manufacturing an antenna as defined in claim 1, in which:
   the dielectric material comprises polypropylene.

3. A method of manufacturing an antenna as defined in claim 1, in which:
   the outer covering comprises polyurethane.

* * * * *